(12) United States Patent
Hirose

(10) Patent No.: US 8,508,633 B2
(45) Date of Patent: Aug. 13, 2013

(54) IMAGE DEVICE WITH COLOR AND BRIGHTNESS SIGNAL PROCESSING

(75) Inventor: Nobuyuki Hirose, Tokyo (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/355,902

(22) Filed: Jan. 23, 2012

(65) Prior Publication Data
US 2012/0176513 A1    Jul. 12, 2012

Related U.S. Application Data

(63) Continuation of application No. PCT/JP2010/006386, filed on Oct. 29, 2010.

(30) Foreign Application Priority Data

May 12, 2010 (JP) .................................. 2010-109893

(51) Int. Cl.
*H04N 3/14*    (2006.01)
*H04N 5/335*    (2011.01)
*H04N 9/04*    (2006.01)
*H04N 5/217*    (2011.01)

(52) U.S. Cl.
USPC .......................................... 348/277; 348/241

(58) Field of Classification Search
USPC .......................... 348/272, 273, 277, 241–243
See application file for complete search history.

(56) References Cited

U.S. PATENT DOCUMENTS

| 2006/0177129 A1* | 8/2006 | Matsuyama | 382/167 |
| 2006/0186322 A1* | 8/2006 | Matsuyama | 250/226 |
| 2008/0079807 A1* | 4/2008 | Inuiya et al. | 348/70 |
| 2010/0265383 A1* | 10/2010 | Iwauchi | 348/336 |

FOREIGN PATENT DOCUMENTS

| JP | 2001-069519 A | 3/2001 |
| JP | 2002-142228 A | 5/2002 |
| JP | 2004-229034 A | 8/2004 |
| JP | 2005-006066 A | 1/2005 |

OTHER PUBLICATIONS

International Search Report for PCT/JP2010/006386 dated Dec. 7, 2010.

* cited by examiner

*Primary Examiner* — Kelly L Jerabek
(74) *Attorney, Agent, or Firm* — Pearne & Gordon LLP

(57) ABSTRACT

An imaging device (100) includes: an imaging element (103) obtained by repeatedly arranging a pixel W for entire wavelength band, a W-R pixel for R, a W-G pixel for G, and a W-B pixel for B; a filter (102) configured such that a portion corresponding to the pixel W allows the entire wavelength band of a wavelength band within a certain range to pass and portions corresponding to the W-R pixel, the W-G pixel, and the W-B pixel reflect wavelength bands of corresponding colors, respectively; a reflection amount calculating unit (113) for calculating signal values of R, G, and B by subtracting a value of an image reading signal of each of the W-R pixel, the W-G pixel, and the W-B pixel from a value of an image reading signal of the pixel W.

2 Claims, 10 Drawing Sheets

IMAGE DEVICE WITH COLOR AND BRIGHTNESS SIGNAL PROCESSING

RELATED APPLICATIONS

The present application claims benefits of the patent application No. 2010-109893 filed in Japan on May 12, 2010, and the contents of the application are incorporated herein by reference.

TECHNICAL FIELD

The present invention relates to an imaging device, which uses an imaging element, and especially relates to the imaging device for imaging a color image using the imaging element.

BACKGROUND ART

Recently, the number of pixels of the imaging element for a digital camera increases, and according to this, minimization of the pixel of the imaging element develops. When the pixel of the imaging element is minimized, a saturation charge amount of each pixel becomes smaller, and as a result, deterioration in an S/N ratio becomes significant and an image quality is deteriorated.

Although it is tried to remove noise by signal processing against the deterioration in the S/N ratio, the noise and a signal cannot be completely separated by such signal processing and this often causes the deterioration in the image quality. Therefore, in order to maintain excellent image quality even when the saturation charge amount decreases due to the minimization of the pixel, it is desirable to allow light to be incident on the pixel as much as possible. For this, a method of enlarging a bandwidth of a wavelength, which is incident on the pixel of the imaging element, is considered.

In a color imaging device, which uses the imaging element such as a charge coupled device (CCD) and a complementary metal oxide semiconductor (CMOS), in general, an infrared cut filter for cutting an infrared component in incident light is arranged on the front of the imaging element in order to improve color reproducibility.

However, when the infrared cut filter is used, an amount of light incident on the pixel decreases. Therefore, when it is wanted to obtain a sufficient amount of light, the light out of an infrared region is allowed to enter without using the infrared cut filter, however, in this case, the infrared component is included in the incident light and the color reproducibility is significantly deteriorated.

A reason of the deterioration in the color reproducibility when the infrared component is included in the incident light will be described with reference to the drawings. In general, one color filter for one pixel is attached to the imaging element. FIG. 7 illustrates a general filter arrangement. As illustrated in FIG. 7, the filters attached to the imaging element have a so-called Bayer arrangement in which three elementary colors of red (R), green (G), and blue (B) are used. FIG. 8 illustrates spectral characteristics in elementary color filters. FIG. 9 illustrates the spectral characteristics in the elementary color filters when using the infrared cut filter. Relative to the incident light as illustrated in FIG. 8, a part with a longer frequency than an infrared cut frequency is cut as illustrated in FIG. 9.

In a general image signal processing of a camera, white balance adjustment is performed such that values of R, G, and B are the same when a white object is photographed. If values of RGB before the white balance adjustment are set to Rorg, Gorg, and Borg, white balance adjustment gains are set to Rgain, Ggain, and Bgain, and the values of RGB after the white balance adjustment are set to Rwh, Gwh, and Bwh, following equations are obtained.

$$Rwh = Rorg \times Rgain$$

$$Gwh = Gorg \times Ggain$$

$$Bwh = Borg \times Bgain$$

With ideal white balance adjustment gains, Rwh=Gwh=Bwh is satisfied when the white object is photographed. FIGS. 10(a) and (b) illustrate change in signal amounts of RGB at the time of ideal white balance.

When there is no infrared cut filter, depending on a light source and a subject, a signal of the infrared component is accumulated as illustrated in FIG. 11(a) also for the white object. The signal of the infrared component does not have correct RGB balance, so that by multiplying the white balance adjustment gains, Rwh=Gwh=Bwh is not satisfied as illustrated in FIG. 11(b) and coloring occurs. For a chromatic subject other than white, the balance of R, G, and B is similarly disrupted by an effect of the infrared component and the white balance adjustment. For these reasons, the color reproducibility of the camera is deteriorated when the infrared component is included in the incident light.

Some methods are suggested for overcoming the above-described problem. An imaging device disclosed in the patent document 1 has a configuration illustrated in FIG. 12. The imaging device realizes improvement in color reproducibility for a bright subject and improvement in sensitivity for a dark subject by putting on the infrared cut filter in the day time with sufficient illumination intensity and removing the infrared cut filter from the front of the imaging element and selecting a black-white signal to output based on a result of the signal processing of a video signal obtained from the imaging element in the night time without the sufficient illumination intensity.

Also, an imaging device disclosed in the patent document 2 has the RGB pixels and an IR pixel on which visible light and infrared light are incident, as illustrated in FIG. 13, and generates an image using the RGB pixels at the time of high illumination intensity and generates the image using the IR pixel at the time of low illumination intensity, thereby realizing the improvement in color reproducibility for the bright subject and the improvement in sensitivity for the dark subject.

PATENT DOCUMENTS

Patent Document 1: Japanese Patent Application Laid-Open (JP-A) No. 2004-229034
Patent Document 2: JP-A No. 2005-6066

DISCLOSURE OF THE INVENTION

Problem to be Solved by the Invention

In the method disclosed in the patent document 1, there is a problem that the image is always a black-white image when a near-infrared image is output. Especially, even in a case in which there is a colored bright subject in a part of an area, only the black-white image is obtained as an entire image. Also, since a mechanism for switching the filter is required, there is difficulty in making the imaging device smaller and there is a problem of high cost.

Although the imaging device disclosed in the patent document 2 has a filter configuration illustrated in FIG. 13, this does not use the IR pixel for the infrared light of which number is one-quarter of the number of all pixels in the daytime, so that resolution and an amount of received light are small. In the night time also, the number of pixels, which receive the infrared component, is only one-quarter of the number of all pixels, and three-quarters of the all pixels are not used, so that the resolution and the amount of received light are small.

A general RGB filters allow the infrared component to pass, so that the infrared cut filter for removing the infrared component is provided on the front of the filter in general in order to remove the infrared components, however, since it is required to allow the infrared light to be incident on the IR pixel for detecting the infrared component in the imaging device disclosed in the patent document 2, the infrared cut filter cannot be provided on the front of the same. Therefore, in order to ensure high color reproducibility in the imaging device of the patent document 2, it is required that the RGB filters have the characteristics to remove the infrared component, so that there is a lot of practical problems and there is also a problem of significantly increasing cost even when this may be realized.

The present invention is achieved in order to solve the above-described problem, and an object thereof is to provide an imaging device capable of improving the sensitivity by increasing the amount of light incident on the imaging element by eliminating necessity of the infrared cut filter and avoiding the deterioration in the color reproducibility by not using the infrared cut filter.

Means for Solving the Problem

In order to solve the above-described conventional problem, an imaging device has a configuration including: an imaging element obtained by repeatedly arranging a pixel for entire wavelength band and three types of pixels for specific color corresponding to three specific colors, respectively, for obtaining an image reading signal having a value corresponding to an amount of received light for each pixel; a filter arranged on the front of the imaging element and configured such that a portion corresponding to the pixel for entire wavelength band allows an entire wavelength band of a wavelength band within a certain range to pass and portions corresponding to the three types of pixels for specific color reflect wavelength bands of corresponding specific colors, respectively; a reflection amount calculating unit for calculating a signal value of the specific color by subtracting a value of an image reading signal of the pixel for specific color from a value of an image reading signal of the pixel for entire wavelength band; a color-difference component generating unit for generating a color-difference signal based on the signal value of the specific color; and a brightness signal generating unit for generating a brightness signal using the image reading signal of the pixel for entire wavelength band.

In the above-described imaging device, the three types of pixels for specific color are a W-R pixel, a W-G pixel, and a W-B pixel, the filter is configured such that a portion corresponding to the W-R pixel reflects a red wavelength band, a portion corresponding to the W-G pixel reflects a green wavelength band, and a portion corresponding to the W-B pixel reflects a blue wavelength band, and the reflection amount calculating unit calculates a signal value of a red component by subtracting a value of an image reading signal of the W-R pixel from the value of the image reading signal of the pixel for entire wavelength band, a signal value of a green component by subtracting a value of an image reading signal of the W-G pixel from the value of the image reading signal of the pixel for entire wavelength band, and a signal value of a blue component by subtracting a value of an image reading signal of the W-B pixel from the value of the image reading signal of the pixel for entire wavelength band.

In the above-described imaging device, the wavelength band within the certain range includes the infrared region and the filter is configured such that the infrared light may be incident on the pixel for specific color and the pixel for entire wavelength band.

In the above-described imaging device, the color-difference component generating unit sets color difference to 0 when a value of the brightness signal generated by the brightness signal generating unit is a maximum value regardless of the signal value of the red component, the signal value of the green component, and the signal value of the blue component obtained by the reflection amount calculating unit.

Effect of the Invention

The present invention may improve the sensitivity by eliminating the necessity of the infrared cut filter and avoiding the deterioration in the color reproducibility occurred by not using the infrared cut filter.

As described hereinafter, there is another aspect of the present invention. Therefore, disclosure of the invention is intended to provide a part of the present invention and is not intended to limit the scope of the invention herein described and claimed.

BEST MODE FOR CARRYING OUT THE INVENTION

Figure 1:
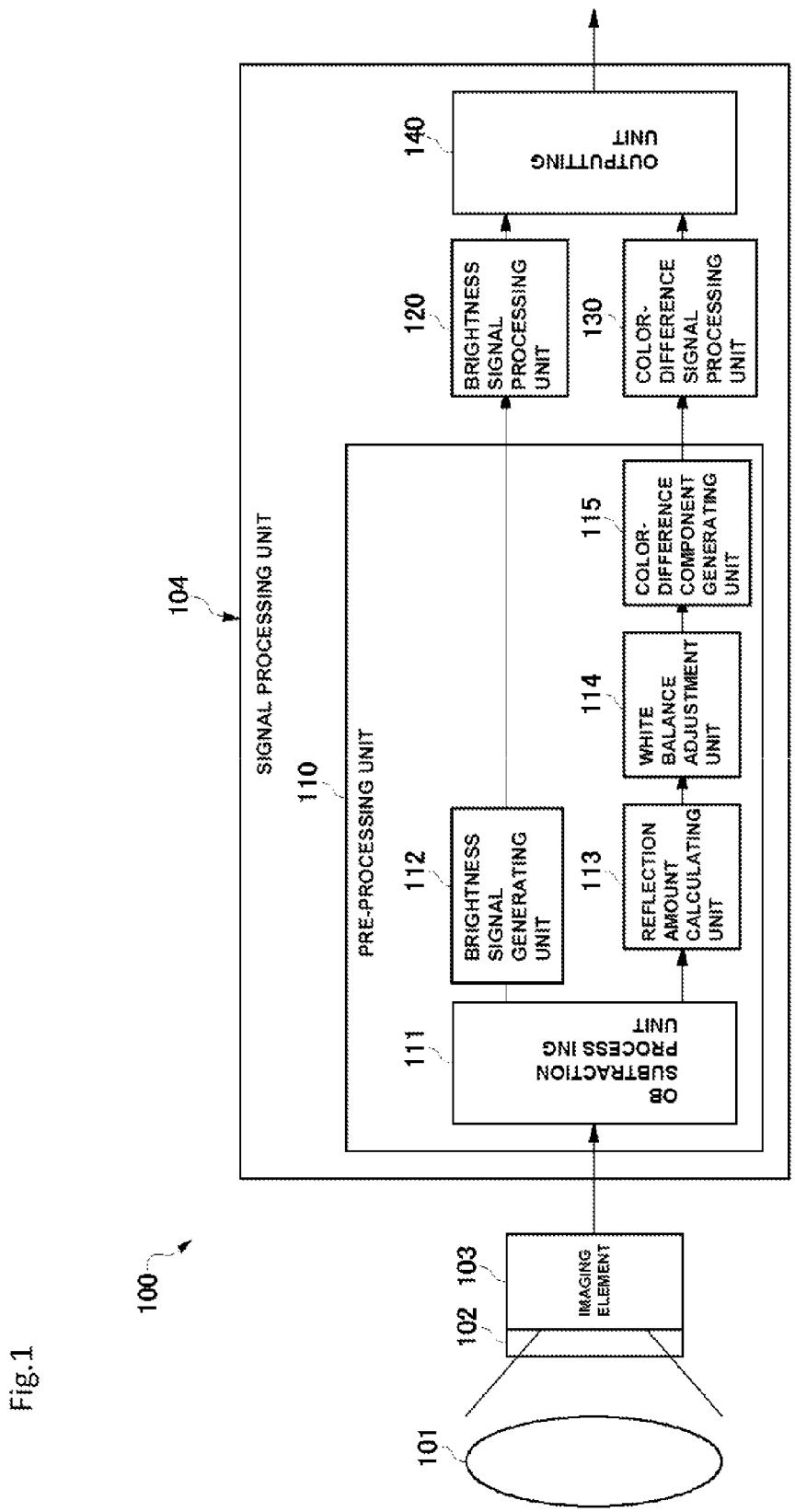
FIG. 1 is a configuration diagram of an imaging device of an embodiment of the present invention.

The present invention is hereinafter described in detail. Embodiments to be described hereinafter are merely an example of the present invention and the present invention may be modified to various modes. Therefore, specific configuration and function to be disclosed hereinafter are not intended to limit the scope of claims.

An imaging device of the embodiment of the present invention has a configuration including: an imaging element obtained by repeatedly arranging a pixel for entire wavelength band and three types of pixels for specific color corresponding to three specific colors, respectively, for obtaining an image reading signal having a value corresponding to an amount of received light for each pixel; a filter provided on the front of the imaging element and configured such that a portion corresponding to the pixel for entire wavelength band allows an entire wavelength band of a wavelength band within a certain range to pass and portions corresponding to the three types of pixels for specific color reflect wavelength bands of corresponding specific colors, respectively; a reflection amount calculating unit for calculating a signal value of the specific color by subtracting a value of an image reading signal of the pixel for specific color from a value of an image reading signal of the pixel for entire wavelength band; a color-difference component generating unit for generating a color-difference signal based on the signal value of the specific color; and a brightness signal generating unit for generating a brightness signal using the image reading signal of the pixel for entire wavelength band.

By this configuration, it is not required to use an infrared cut filter, so that a highly-sensitive imaging device in which an amount of light of a subject is not decreased by the infrared cut filter may be realized. The entire wavelength band in the wavelength band within the certain range is incident on the pixel for entire wavelength band, so that the brightness signal generating unit may obtain a highly-sensitive brightness signal by generating the brightness signal using the image reading signal of the pixel for entire wavelength band. Although an infrared component may be included in the image reading signal of the pixel for entire wavelength band and the image reading signal of the pixel for specific color, since an amount of the infrared component included in the image reading signal of the pixel for entire wavelength band and that in the image reading signal of the pixel for specific color are the same, when the value of the image reading signal of the pixel for specific color is subtracted from the value of the image reading signal of the pixel for entire wavelength band, the infrared component is not included in difference therebetween and the reflection amount calculating unit may obtain the signal value of the specific color without the infrared component included. Since the color-difference component generating unit generates the color difference-signal based on the signal value of the specific color without the infrared component included, color reproducibility of the color-difference signal is not deteriorated by not providing the infrared cut filter. That, is to say, according to the configuration of the above-described imaging device, deterioration in the color reproducibility may be avoided while realizing a highly-sensitive imaging device.

In the above-described imaging device, the three types of pixels for specific color are a W-R pixel, a W-G pixel, and a W-B pixel, and the filter is configured such that a portion corresponding to the W-R pixel reflects a red wavelength band, a portion corresponding to the W-G pixel reflects a green wavelength band, and a portion corresponding to the W-B pixel reflects a blue wavelength band, and the reflection amount calculating unit calculates a signal value of a red component by subtracting a value of an image reading signal of the W-R pixel from the value of the image reading signal of the pixel for entire wavelength band, a signal value of a green component by subtracting a value of an image reading signal of the W-G pixel from the value of the image reading signal of the pixel for entire wavelength band, and a signal value of a blue component by subtracting a value of an image reading signal of the W-B pixel from the value of the image reading signal of the pixel for entire wavelength band.

By this configuration, the signal value of the red component, the signal value of the green component, and the signal value of the blue component may be obtained, so that a full-color image may be obtained. Also, the infrared component is not included in the signal value of the red component, the signal value of the green component, and the signal value of the blue component, so that occurrence of coloration may be prevented in white balance adjustment.

In the above-described imaging device, an infrared region is included in the wavelength band within the certain range and the filter is configured such that infrared light may be incident on the pixel for specific color and the pixel for entire wavelength band.

By this configuration, the light of a sufficient amount including the infrared light is incident on each pixel, so that the brightness signal with a high S/N ratio may be generated, and by adopting a method of obtaining the component of the specific color by subtracting the value of the image reading signal corresponding to an amount of incident light except the wavelength band of the specific color from the value of the image reading signal corresponding to the amount of incident light of the entire wavelength band as described above, the infrared component may be eliminated from the pixel value and high color reproducibility may be realized.

In the above-described imaging device, the color-difference component generating unit sets color difference to 0 regardless of the signal value of the red component, the signal value of the green component, and the signal value of the blue component obtained by the reflection amount calculating unit when the value of the brightness signal generated by the brightness signal generating unit is a maximum value.

In a case in which the method of obtaining the pixel value of the specific color by subtracting the value of the image reading signal corresponding to the amount of incident light except the wavelength band of the specific color from the value of the image reading signal corresponding to the amount of the incident light of the entire wavelength band is adopted as described above, when the amount of the incident light of the entire wavelength band is saturated, the occurrence of the coloration may be prevented when the brightness is saturated by setting the color difference to 0.

Hereinafter, the embodiment for carrying out the present invention will be described with reference to the drawings. FIG. 1 is a configuration diagram of the imaging device according to the embodiment of the present invention. In FIG. 1, an imaging device 100 is provided with a lens 101, a filter 102, an imaging element 103, and a signal processing unit 104. The imaging device 100 composes an electronic camera. The filter 102 is attached on the front of the imaging element 103, that is to say, on a side of the lens 101. An optical image, which passes through the lens 101, is illuminated on the imaging element 103 through the filter 102. One W-R pixel, one W-G pixel, one W-B pixel, and one W pixel form one group and this combination is repeatedly arranged in a two-dimensional manner to compose the imaging element 103. The W-R pixel, the W-G pixel, and the W-B pixel correspond to the pixels for specific color of the present invention, respectively, and the W pixel corresponds to the pixel for entire wavelength band of the present invention.

Figure 2:
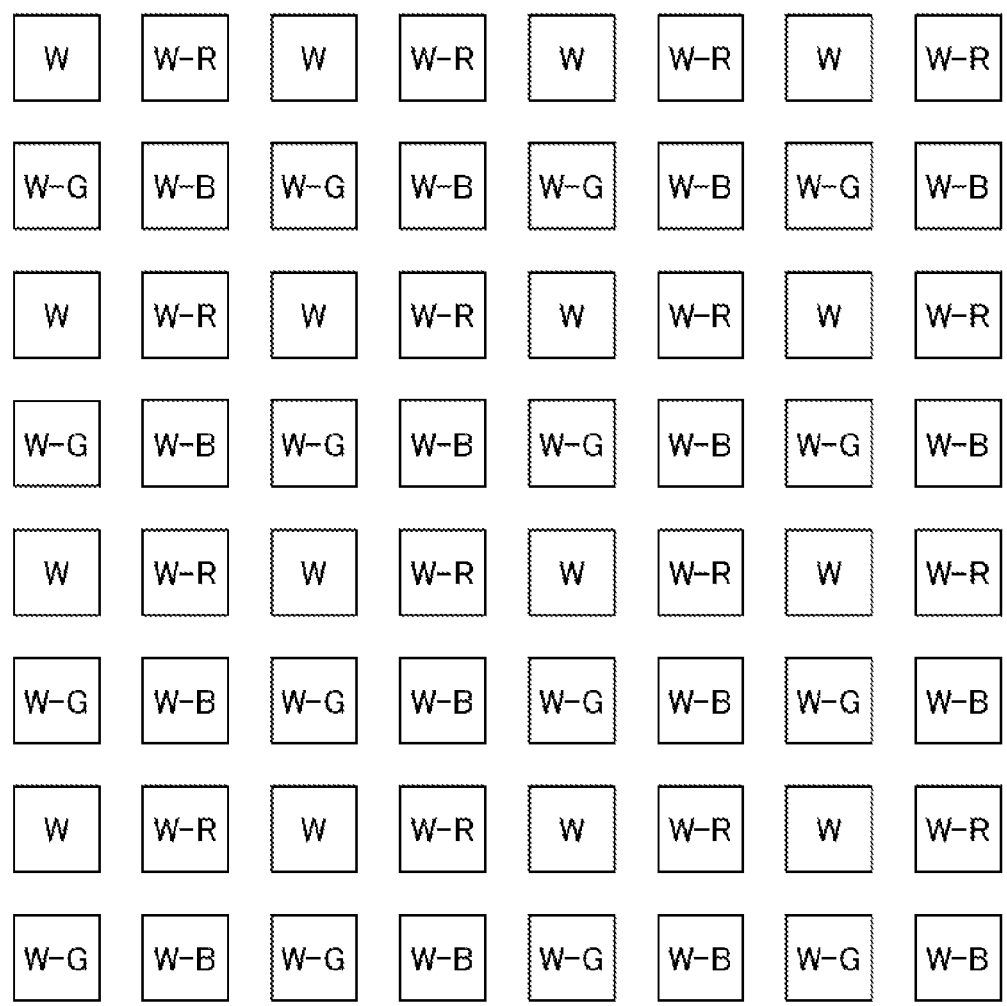
FIG. 2 is a configuration diagram of a filter of the embodiment of the present invention.

FIG. 2 is a configuration diagram of the filter 102. As illustrated in FIG. 2, the filter 102 is configured such that a W-R pixel corresponding portion, a W-G pixel corresponding portion, a W-B pixel corresponding portion, and a W pixel corresponding portion are located in front of the W-R pixel, in front of the W-G pixel, in front of the W-B pixel, and in front of the W pixel, respectively.

Figure 3:
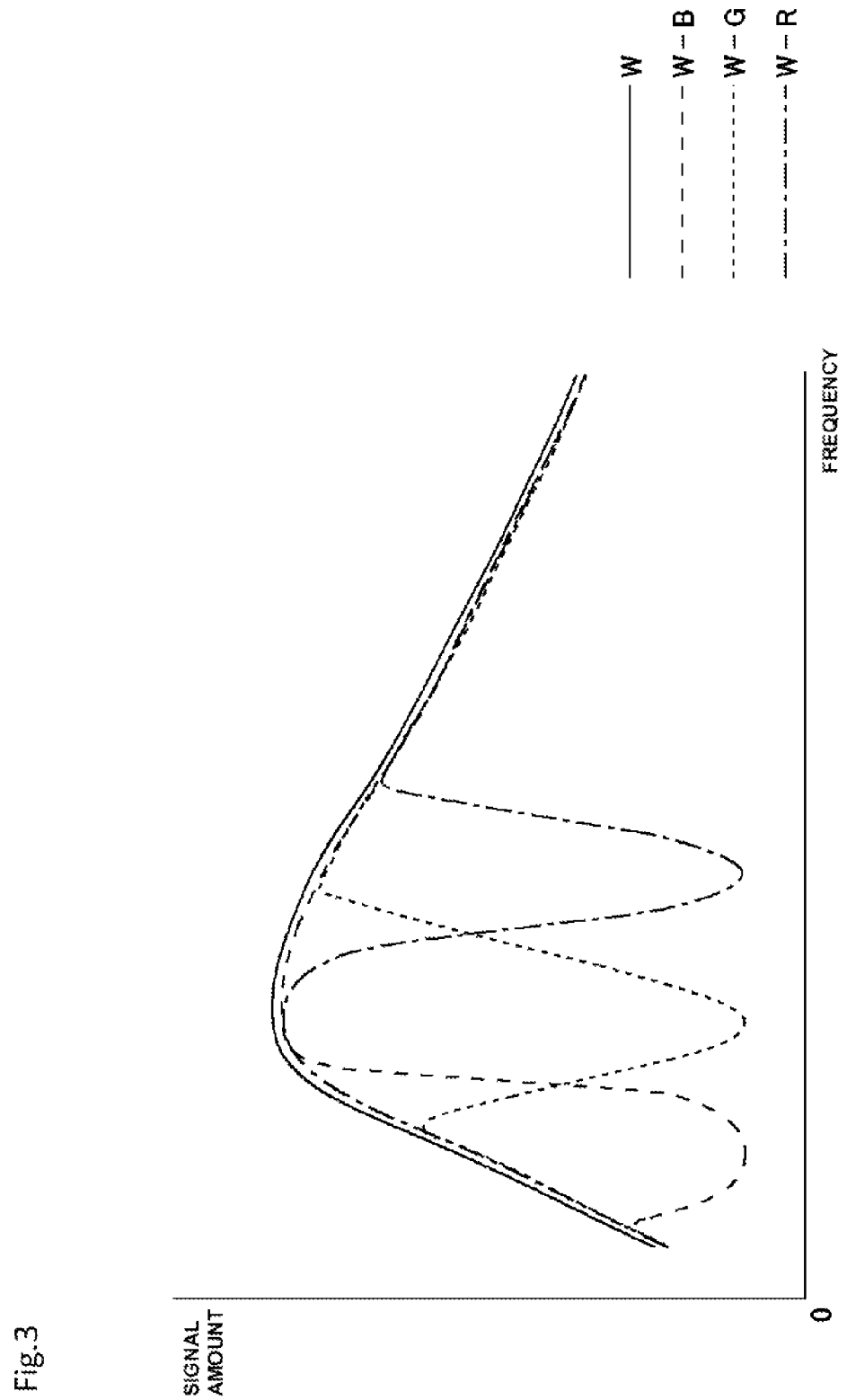
FIG. 3 is a spectral characteristic diagram of the filter of the embodiment of the present invention.
Figure 4:
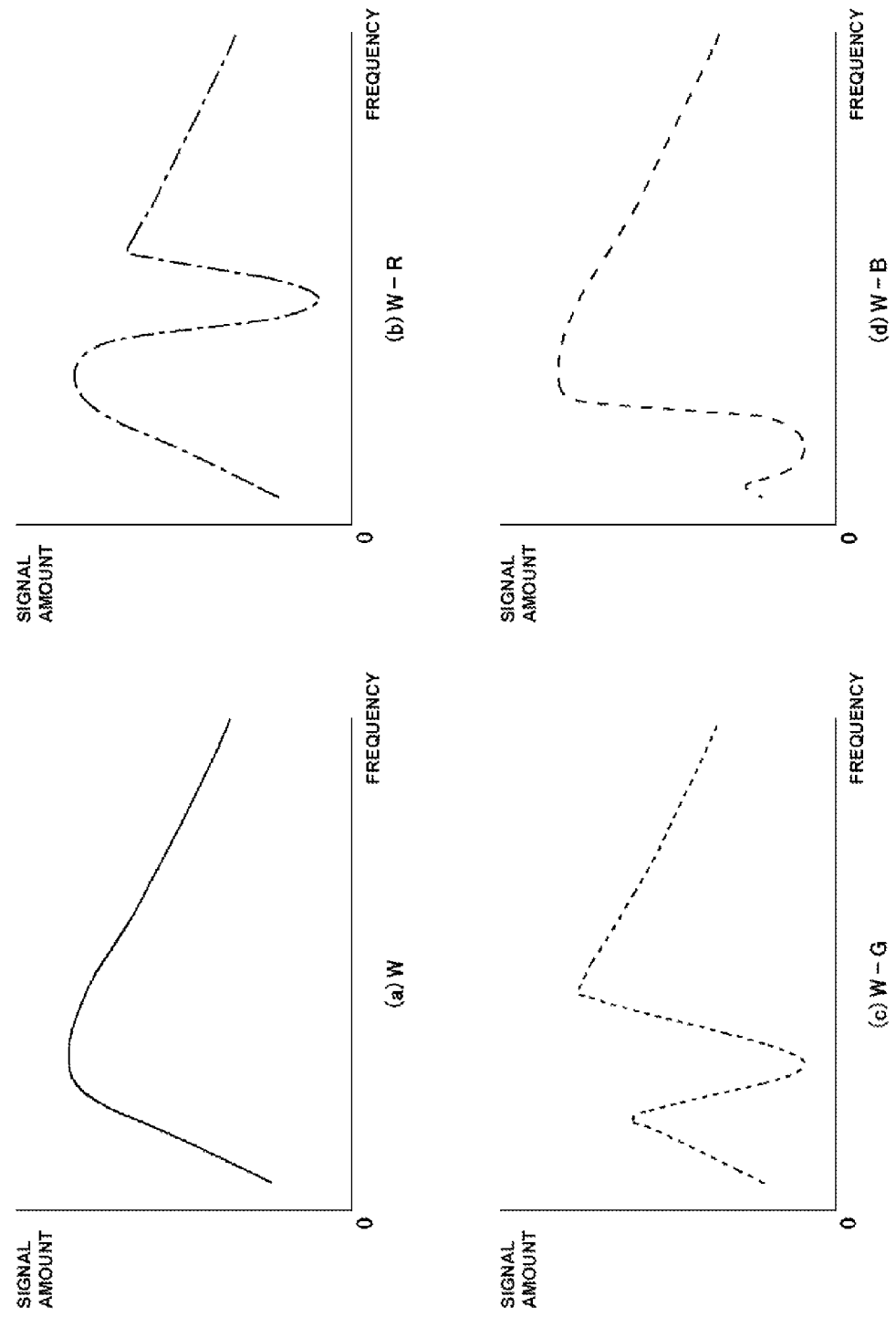
FIG. 4(a) is a spectral characteristic diagram (portion corresponding to W pixel) of the filter of the embodiment of the present invention.
FIG. 4(b) is a spectral characteristic diagram (portion corresponding to W-R pixel) of the filter of the embodiment of the present invention.
FIG. 4(c) is a spectral characteristic diagram (portion corresponding to W-G pixel) of the filter of the embodiment of the present invention.
FIG. 4(d) is a spectral characteristic diagram (portion corresponding to W-B pixel) of the filter of the embodiment of the present invention.

FIG. 3 is a view illustrating spectral characteristics of the filter 102. FIGS. 4(a) to (d) are views illustrating the spectral characteristics of the W pixel corresponding portion, the W-R pixel corresponding portion, the W-G pixel corresponding portion, and the W-B pixel corresponding portion of the filter 102, respectively. As illustrated in FIG. 4, the W pixel corresponding portion allows the entire wavelength band of the wavelength band within the certain range to pass; although the W-R pixel corresponding portion allows the light of the wavelength band within the same range as the W pixel corresponding portion to pass, this reflects the light of the wavelength band corresponding to the red (R) component of the wavelength band within the certain range; although the W-G pixel corresponding portion allows the light of the wavelength band within the same range as the W pixel corresponding portion to pass, this reflects the light of the wavelength band corresponding to the green (G) component of the wavelength band within the certain range; and although the W-B pixel corresponding portion allows the light of the wavelength band within the same range as the W pixel corresponding portion to pass, this reflects the light of the wavelength band corresponding to the blue (B) component of the wavelength band within the certain range.

Since the W pixel corresponding portion allows the entire wavelength band of the wavelength band within the certain range to pass, the light of the entire wavelength band of the wavelength band within the certain range is incident on the W pixel. Also, since the W-R pixel corresponding portion allows the light other than the reflected R component of the wavelength band within the above-described certain range to pass, the light other than the R component of the wavelength band within the above-described certain range is incident on the W-R pixel. The W-G pixel corresponding portion and the W-B pixel corresponding portion also allow the light other than the G component and the B component of the wavelength band within the above-described certain range to pass, respectively, the light other than the G component and the B component of the wavelength band within the above-described certain range is incident on the W-G pixel and the W-B pixel, respectively.

Figure 7:
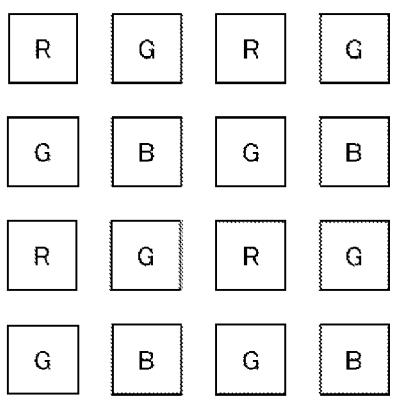
FIG. 7 is a view illustrating an arrangement of conventional elementary color filters.
Figure 8:
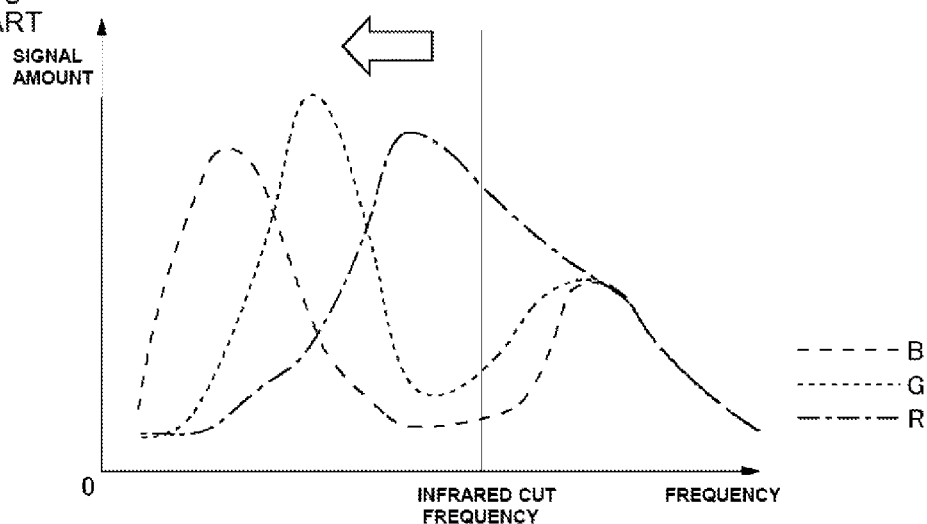
FIG. 8 is a spectral characteristic diagram in the conventional elementary color filters.
Figure 9:
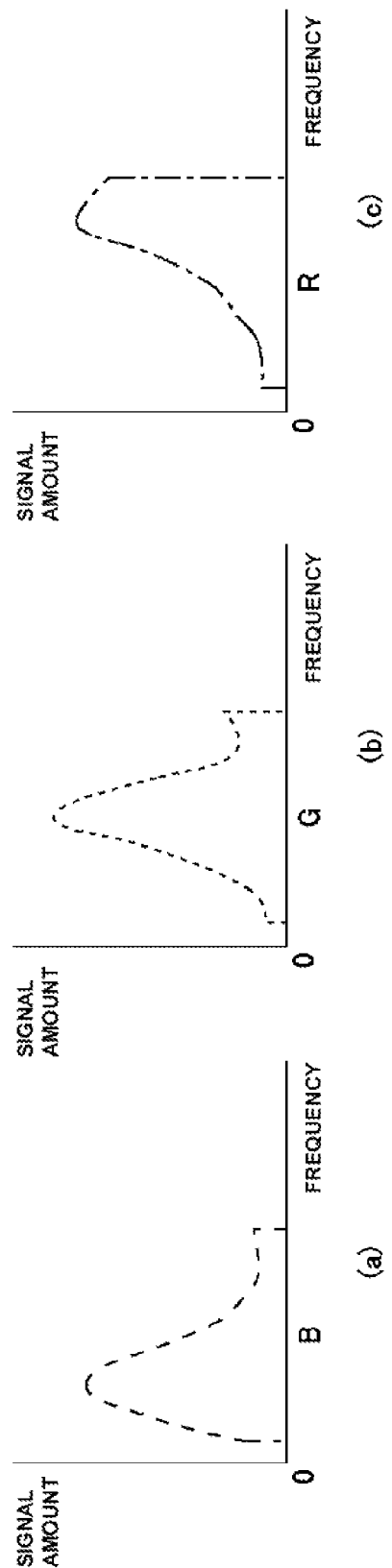
FIG. 9(a) is a spectral characteristic diagram (portion corresponding to W-B pixel) in the conventional elementary color filter.
FIG. 9(b) is a spectral characteristic diagram (portion corresponding to W-G pixel) in the conventional elementary color filter.
FIG. 9(c) is a spectral characteristic diagram (portion corresponding to W-R pixel) in the conventional elementary color filter.
Figure 10:
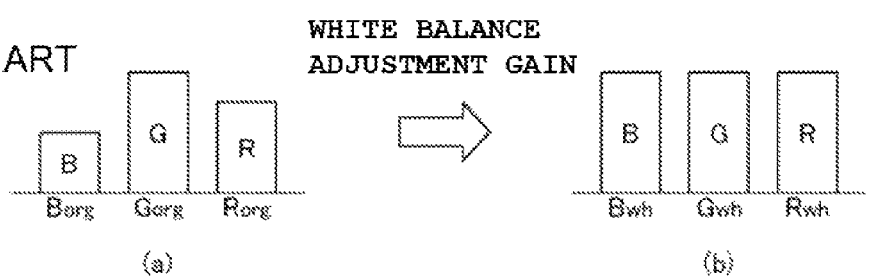
FIG. 10(a) is a view illustrating a pixel value of each pixel (RGB) of a conventional imaging element (when infrared component is cut)
FIG. 10(b) is a view illustrating a pixel value after performing white balance adjustment to each pixel (RGB) of the conventional imaging element (when infrared component is cut)
Figure 11:
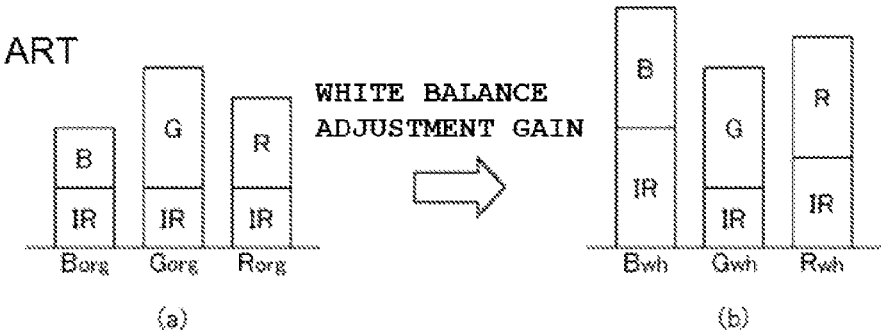
FIG. 11(a) is a view illustrating a pixel value of each pixel (RGB) of the conventional imaging element (when infrared component is not cut)
FIG. 11(b) is a view illustrating a pixel value after performing the white balance adjustment to each pixel (RGB) of the conventional imaging element (when infrared component is not cut)
Figure 12:
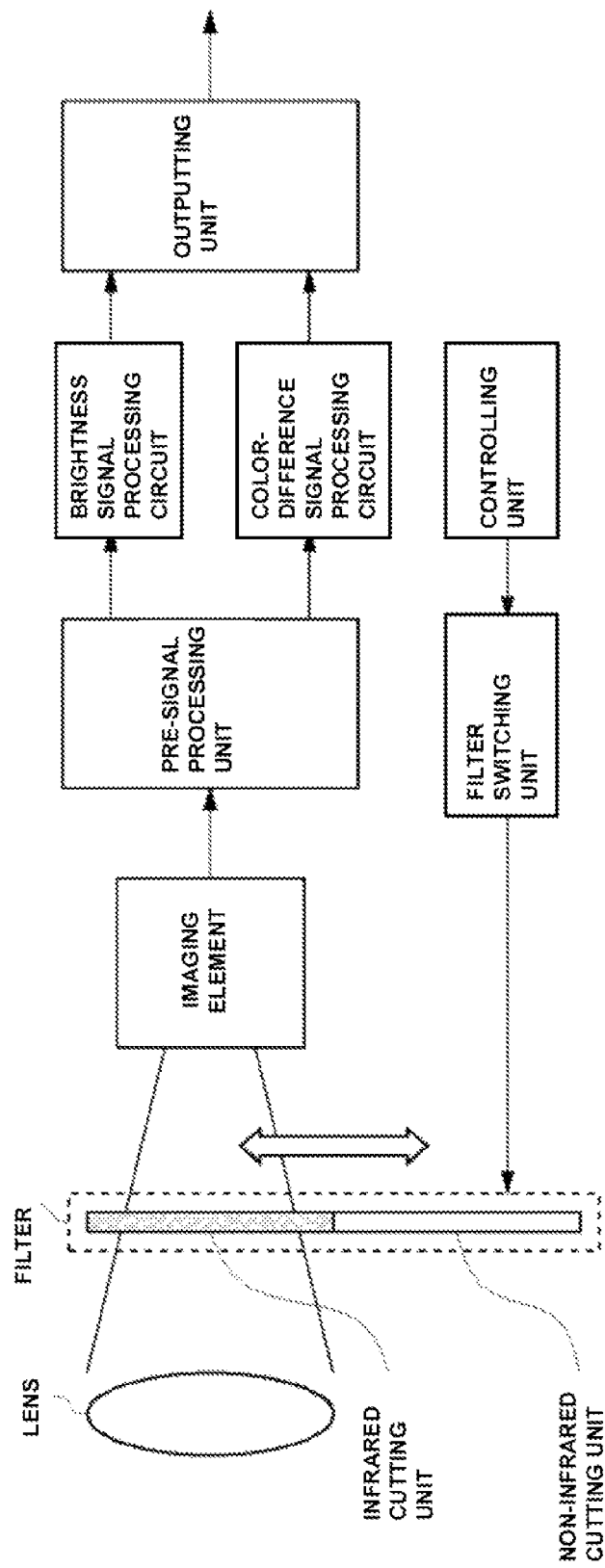
FIG. 12 is a configuration diagram of a conventional imaging device.
Figure 13:
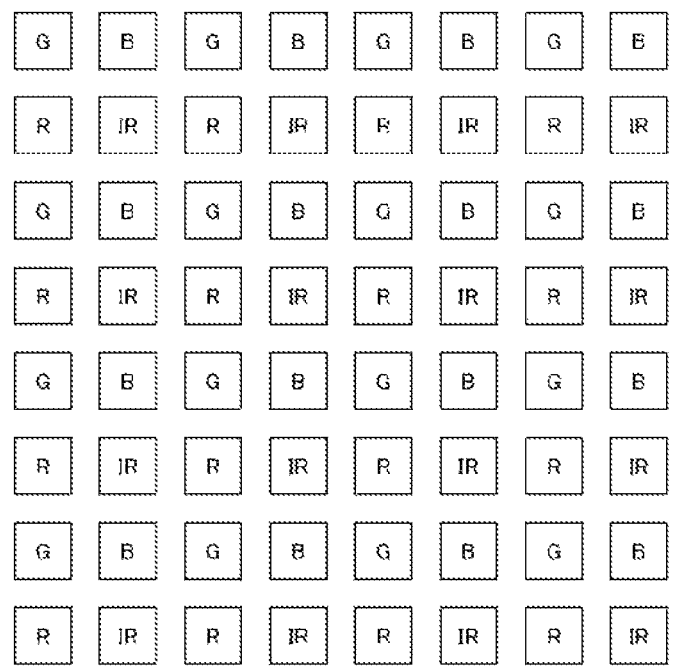
FIG. 13 is a configuration diagram of the conventional imaging element.

As described above, in the imaging device 100 according to this embodiment, the light of the entire wavelength band of the wavelength band within the certain range is directly incident on the W pixel, so that the amount of incident light on the W pixel may be increased relative to the amount of light from the subject. Also, the amount of light obtained by subtracting only the R or G or B component of the wavelength band within the certain range is incident on the W-R pixel, the W-G pixel, and the W-B pixel, respectively, so that the amount of incident light may be increased relative to the amount of light from the subject. Further, since the infrared cut filter is not used in the imaging device 100 according to this embodiment, when the infrared light is included in the wavelength band within the certain range, which passes through the W pixel corresponding portion, the W-R pixel corresponding portion, the W-G pixel corresponding portion, and the W-B pixel corresponding portion of the filter 102, the amount of incident light further increases. That is to say, in the imaging device 100 of this embodiment, a rate of the amount of light incident on the imaging element 103 is high with respect to the amount of light, which arrives at the imaging device 100 from the subject, and the highly-sensitive imaging device is realized. In a case of conventional general R, G, B Bayer arrangement described with reference to FIG. 7, only the light of the R, G, and B components of the light, which arrives at the imaging device from the subject, is allowed to pass, so that sensitivity of the imaging device 100 of this embodiment significantly increases also as compared to that case.

The imaging element 103 generates the image reading signal having a value corresponding to the amount of received light by performing photoelectric conversion to the received light for each pixel and inputs the same to the signal processing unit 104. The signal processing unit 104 includes a pre-processing unit 110, a brightness signal processing unit 120, a color-difference signal processing unit 130, and an outputting unit 140. The image reading signal obtained by the imaging element 103 is input to the pre-processing unit 110 of the signal processing unit 104.

The pre-processing unit 110 includes an OB subtraction processing unit 111, a brightness signal generating unit 112, a reflection amount calculating unit 113, a white balance adjustment unit 114, and a color-difference component generating unit 115. The OB subtraction processing unit 111 performs an OB subtraction process (also referred to as dark current compensation) to subtract an output component (dark current) detected in an optical black (OB) region from the input image reading signal. The image reading signal compensated by the OB subtraction processing unit 111 is input to the brightness signal generating unit 112 and the reflection amount calculating unit 113.

Figure 5:
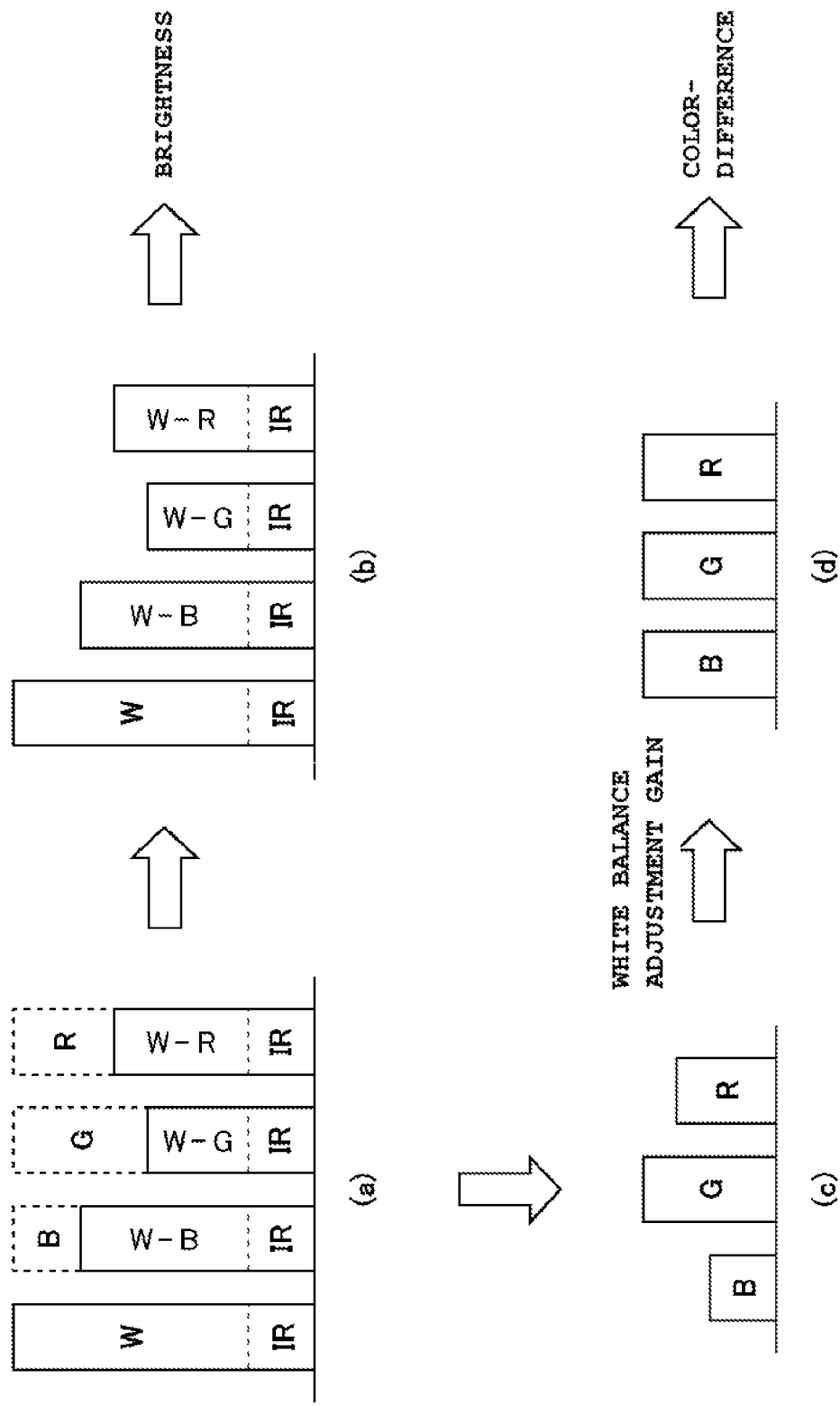
FIG. 5(a) is a view illustrating an image reading signal obtained by an imaging element of the embodiment of the present invention.
FIG. 5(b) is a view illustrating a brightness signal obtained by the imaging element of the embodiment of the present invention.
FIG. 5(c) is a view illustrating a reflection amount of each pixel (RGB) of the imaging element of the embodiment of the present invention.
FIG. 5(d) is a view illustrating a reflection amount after performing white balance adjustment to each pixel (RGB) of the imaging element of the embodiment of the present invention.

FIG. 5 is a view illustrating a flow of generation of the brightness signal and the color-difference signal from the image reading signal. Hereinafter, a configuration after the OB subtraction processing unit 111 of the pre-processing unit 110 in FIG. 1 is described with reference to FIG. 5. FIG. 5(a) is a view illustrating the image reading signal (after the OB subtraction, the same for below) obtained by a certain group of the W-R pixel, the W-G pixel, the W-B pixel, and the W pixel. As illustrated in FIG. 5(a), the W pixel may obtain the image reading signal corresponding to the amount of light of the entire wavelength band of the wavelength band within the certain range. The W-B pixel may obtain the image reading signal obtained by subtracting the value corresponding to the amount of light of the reflected B component from the value of the image reading signal of the W pixel. Similarly, the W-G pixel and the W-R pixel may obtain the image reading signals obtained by subtracting the value corresponding to the amount of light of the reflected G component or R component from the value of the image reading signal of the W pixel, respectively.

FIG. 5(b) is a view illustrating the image reading signal input to the brightness signal generating unit 112 for the pixel in FIG. 5(a). The brightness signal generating unit 112 generates the brightness signal according to the image reading signal. The light of the entire wavelength band of the wavelength band within the certain range out of the light from the subject is incident on the W pixel as described above, and since there is no attenuation of the light by the filter, the brightness signal generating unit 112 generates the brightness signal of which S/N ratio is sufficiently high.

The brightness signal generating unit 112 generates a brightness signal Y using the image reading signals of the W pixel, the W-B pixel, the W-G pixel, and the W-R pixel. Specifically, by generating each pixel by compensating a lacking color component from peripheral pixels, the brightness signal generating unit 112 obtains the brightness signal Y according to a following equation (1) after obtaining a signal value W of entire wavelength component, a signal value W-R obtained by subtracting the red component from the entire wavelength component, a signal value W-G obtained by subtracting the green component from the entire wavelength component, and a signal value W-B by subtracting the blue component from the entire wavelength component of which center of gravity is on the pixel.

$$Y=(A*W+B(W-R)+C(W-G)+D(W-B))/(A+B+C+D) \quad (1)$$

Herein, A, B, C, and D are weighing coefficients used for generating brightness. Meanwhile, the brightness signal generating unit 112 may directly set the image reading signal of the W pixel as the brightness signal.

FIG. 5(c) is a view illustrating a reflection amount obtained by the pixel in FIG. 5(a). The reflection amount calculating unit 113 calculates a reflection amount of the R component in the W-R pixel corresponding portion, the reflection amount of the G component in the W-G pixel corresponding portion, and the reflection amount of the B component in the W-B pixel corresponding portion of the filter 102 for each pixel.

Specifically, the reflection amount calculating unit 113 obtains the signal value of the R component by subtracting the value of the image reading signal of the W-R pixel from the value of the image reading signal of the W pixel. Similarly, the reflection amount calculating unit 113 obtains the signal value of the G component by subtracting the value of the image reading signal of the W-G pixel from the value of the image reading signal of the W pixel and obtains the signal value of the B component by subtracting the value of the image reading signal of the W-B pixel from the value of the image reading signal of the W pixel. The signal values indicate the amount of the R component reflected by the filter portion corresponding to the W-R pixel, the amount of the G component reflected by the filter portion corresponding to the W-G pixel, and the amount of the B component reflected by the filter portion corresponding to the W-B pixel.

Since the infrared component of the same amount is included in the image reading signal of the W pixel and the image reading signal of each of the W-R pixel, the W-G pixel, and W-B pixel, the infrared component is set to 0 in the reflection amount of each of R, G, and B obtained as difference between the image reading signal of the W pixel and the image reading signal of each of the W-R pixel, the W-G pixel, and the W-B pixel, respectively. Therefore, the signal value of the R component, the signal value of the G component, and the signal value of the B component obtained as the reflection amounts indicate the amount of light of the R component, the G component, and the B component without the infrared component included.

The signal value of the R component, the signal value of the G component, and the signal value of the B component are input to the white balance adjustment unit 114. FIG. 5(d) is a view illustrating the pixel values after performing the white balance adjustment to each pixel in FIG. 5(c). The white balance adjustment unit 114 performs the white balance adjustment by multiplying a white balance adjusting gain by the signal value of the R component, the signal value of the G component, and the signal value of the B component. The signal values adjusted by the white balance adjustment are input to the color-difference component generating unit 115.

The color-difference component generating unit 115 generates color-difference signals U and V based on the signal value of the R component, the signal value of the G component, and the signal value of the B component after the white balance adjustment. Specifically, the color-difference component generating unit 115 generates the color-difference signals U and V according to following equations (2) and (3).

$$U=-0.169R-0.331G+0.500B \quad (2)$$

$$V=0.500R-0.419G-0.081B \quad (3)$$

Herein, the signal value of the R component, the signal value of the G component, and the signal value of the B component are obtained by subtracting the image reading signal of each of the W-R pixel, the W-G pixel, and the W-B pixel from the image reading signal of the W pixel by the above-described reflection amount calculating unit 113, respectively, and when the signal of W is saturated, the value indicated by the image reading signal of the pixel for W becomes smaller than the value corresponding to an actual amount of incident light. As a result, when subtracting the image reading signal of the W-R pixel, the W-G pixel, and the W-B pixel from the image reading signal of such W pixel, the signal value of the R component, the signal value of the G component, and the signal value of the B component, which are obtained, might be smaller than actual R component, G component, and B component in the incident light. Therefore, when the image reading signal of the W pixel is of high brightness such as to be saturated, there is a case in which the signal value of the R component, the signal value of the G component, and the signal value of the B component are not correctly obtained.

Figure 6:
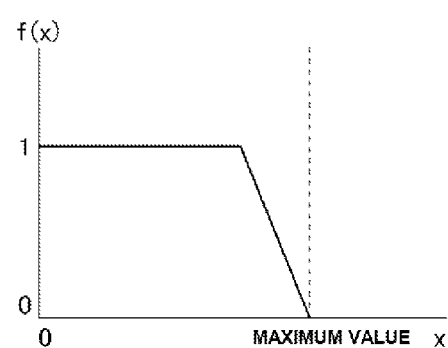
FIG. 6 is a view illustrating a function for improving color reproducibility a near high-brightness portion of the embodiment of the present invention.

On the other hand, when the image reading signal of the W pixel is saturated, this means that the brightness is saturated, and in this case, it is not required to especially color the pixel and it is desirable that the color difference of this pixel is set to 0. Therefore, the color-difference component generating unit 115 obtains corrected color-difference signals U' and V' by multiplying a value obtained by substituting the value of the image reading signal of the W pixel to a function f(x) having characteristics illustrated in FIG. 6 by the color-difference signals U and V obtained as described above and outputs the corrected color-difference signals U' and V'. That is to say, as illustrated in FIG. 6, when the value of the image reading signal of the W pixel is small, the values of U and V are directly output as U' and V', when the value of the image reading signal of the W pixel becomes larger than a predetermined threshold, the values of U' and V' are made smaller relative to the values of U and V as the value of the image reading signal of the W pixel increases, and U' and V' are set to 0 at a maximum value of the image reading signal of the W pixel. According to this, it is possible to eliminate the deterioration in the color reproducibility also a near high-brightness portion and it becomes possible to further improve the color reproducibility near the high-brightness portion.

Meanwhile, the function f(x) is not limited to be gradually decreased according to the brightness on the high-brightness portion as illustrated in FIG. 6, and may be the function f(x)=1 up to the maximum value and f(x)=0 at the maximum value.

The brightness signal Y generated by the brightness signal generating unit 112 is processed by the brightness signal processing unit 120, the color-difference signals U' and V' generated by the color-difference component generating unit 115 are processed by the color-difference signal processing unit 130, and they are synthesized together with a synchronization signal by the outputting unit 140 to be output to outside as a video signal.

As described above, according to the imaging device of this embodiment, the infrared cut filter is not necessary, so that there is no attenuation of the light by the infrared cut filter in a low illumination time such as night and the high S/N ratio may be ensured, so that deterioration in image quality may be inhibited. Also, the above-described effect may be achieved by a structure not expensive without necessity of a mechanism to switch the filter. Further, since the light of the entire wavelength band of the wavelength band within the certain range is incident on the W pixel and the lights of the component other than the wavelength band of the corresponding color is incident on the W-R pixel, the W-G pixel, and the W-B pixel, so that the amount of light incident on each pixel of the imaging element significantly increases. Especially, when an infrared band is included in the wavelength band within the certain range, the infrared light also is incident, so that the amount of incident light further increases. Further, the imaging device of this embodiment may create the color-difference signal without the infrared component included as well as obtaining a large amount of incident light including the infrared light, so that the electronic camera with the high S/N ratio and high color reproducibility may be realized.

Although the preferred embodiment of the present invention conceivable at present is described above, various modifications may be made to this embodiment and it is intended that appended claims include the real spirit of the present invention and all the modifications within the scope.

Industrial Applicability

As described above, the present invention is capable of improving the sensitivity by eliminating the necessity of the infrared cut filter and avoiding the deterioration in the color reproducibility by not using the infrared cut filter, and is useful as the imaging device and the like for imaging the color image using the imaging element.

Description Of Reference Numerals 100 imaging device
101 lens
102 filter
103 imaging element
104 signal processing unit
110 pre-processing unit
111 OB subtraction processing unit
112 brightness signal generating unit
113 reflection amount calculating unit
114 white balance adjustment unit
115 color-difference component generating unit
120 brightness signal processing unit
130 color-difference signal processing unit
140 outputting unit

The invention claimed is:

1. An imaging device, comprising:
an imaging element obtained by repeatedly arranging a pixel for entire wavelength band and three or more types of pixels for specific color corresponding to three or more specific colors, respectively, for obtaining an image reading signal having a value corresponding to an amount of received light for each pixel;
a filter arranged on the front of the imaging element and configured such that a portion corresponding to the pixel for entire wavelength band allows an entire wavelength band of a wavelength band within a certain range, the wavelength band including the infrared region, to pass and portions corresponding to the three or more types of pixels for specific color reflect wavelength bands of corresponding specific colors, respectively, the filter being configured such that infrared light is capable of being incident on the pixels for specific color and the pixel for the entire wavelength band;
a reflection amount calculating unit for calculating a signal value of each of the specific colors by subtracting a value of an image reading signal of each of the pixels for specific color from a value of an image reading signal of the pixel for entire wavelength band;
a color-difference component generating unit for generating a color-difference signal based on the signal value of the specific color, such that the generated color difference signal does not include an infrared component; and
a brightness signal generating unit for generating a brightness signal using the image reading signal of the pixel for entire wavelength band, the brightness signal including an infrared component;
wherein the three or more types of pixels for specific color are a W-R pixel, a W-G pixel, and a W-B pixel, the filter is configured such that a portion corresponding to the W-R pixel reflects a red wavelength band, a portion corresponding to the W-G pixel reflects a green wavelength band, and a portion corresponding to the W-B pixel reflects a blue wavelength band; and
the reflection amount calculating unit calculates a signal value of a red component by subtracting a value of an image reading signal of the W-R pixel from the value of the image reading signal of the pixel for entire wavelength band, a signal value of a green component by subtracting a value of an image reading signal of the W-G pixel from the value of the image reading signal of the pixel for entire wavelength band, and a signal value of a blue component by subtracting a value of an image reading signal of the W-B pixel from the value of the image reading signal of the pixel for entire wavelength band.

2. The imaging device according to claim 1, wherein the color-difference component generating unit sets a color difference to 0 regardless of the signal value of the red component, the signal value of the green component., and the signal value of the blue component obtained by the reflection amount calculating unit when a value of the brightness signal generated by the brightness signal generating unit is a maximum value.

* * * * *